Figure 1:
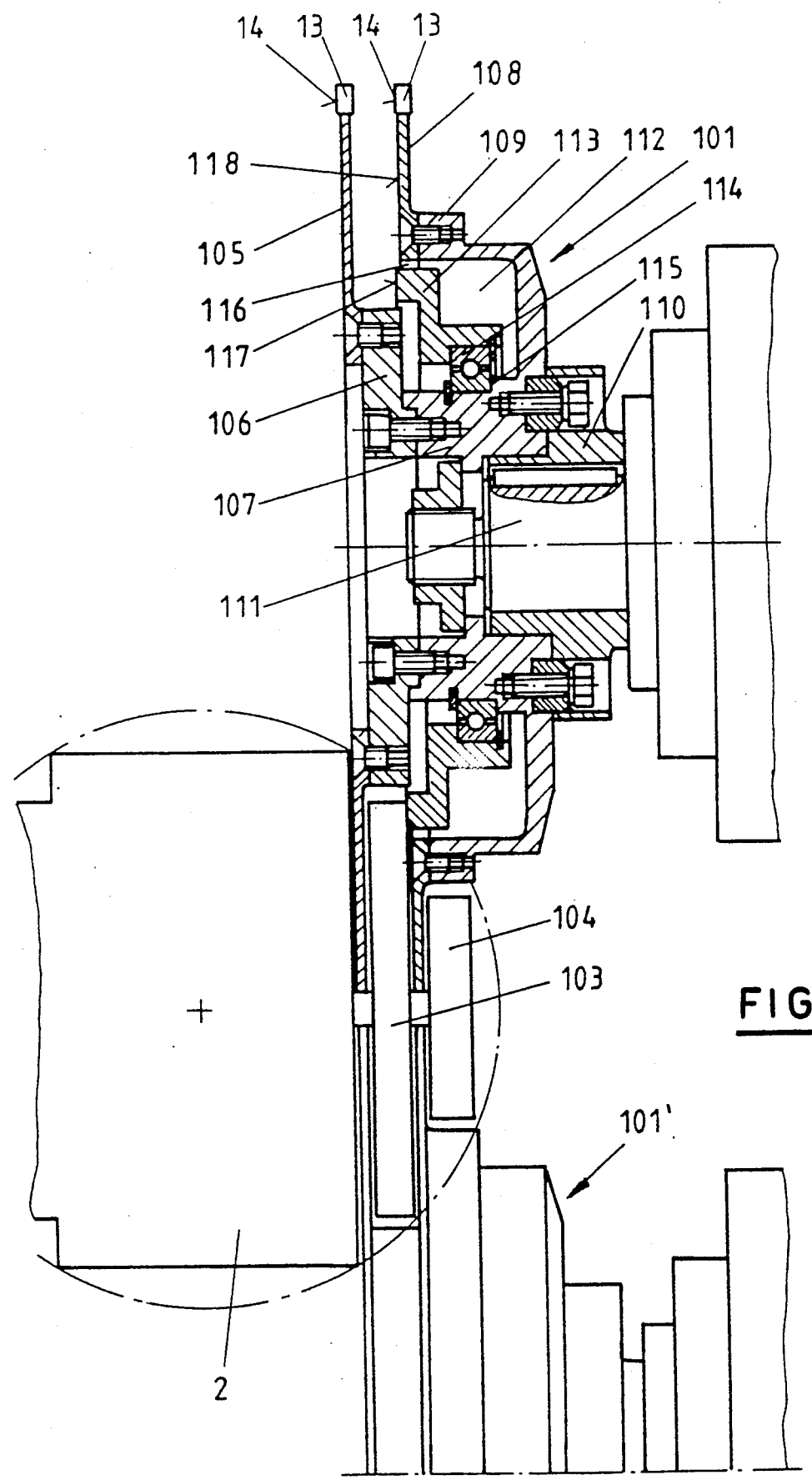

United States Patent [19]

Reuter

[11] Patent Number: 5,027,517
[45] Date of Patent: Jul. 2, 1991

[54] CIRCULAR SAW HEAD

[75] Inventor: Alfred Reuter, Oberkirch, Fed. Rep. of Germany

[73] Assignee: Gebruder Linck Maschinenfabrik "Gatterlinck" GmbH & Co. KG, Oberkirch, Fed. Rep. of Germany

[21] Appl. No.: 415,285

[22] PCT Filed: Dec. 18, 1987

[86] PCT No.: PCT/EP87/00800
§ 371 Date: Aug. 23, 1989
§ 102(e) Date: Aug. 23, 1989

[87] PCT Pub. No.: WO88/04970
PCT Pub. Date: Jul. 14, 1988

[30] Foreign Application Priority Data
Dec. 24, 1986 [DE] Fed. Rep. of Germany ....... 3644503
May 9, 1987 [DE] Fed. Rep. of Germany ....... 3715578

[51] Int. Cl.⁵ .................. B26B 13/00; B26B 1/12; B27B 1/00
[52] U.S. Cl. ........................ 30/265; 83/666; 144/378
[58] Field of Search .......... 30/265, 267, 388; 83/666, 703; 125/13.01, 13.03, 15; 144/39, 377, 378

[56] References Cited

U.S. PATENT DOCUMENTS

| 3,656,395 | 4/1972 | Goelimer | 83/666 |
| 3,889,333 | 6/1975 | Katz | 83/666 |
| 4,513,544 | 4/1985 | Lossl et al. | 125/15 |
| 4,633,847 | 1/1987 | Lossl et al. | 125/15 |
| 4,690,188 | 9/1987 | Hasenwinkle | 144/378 |

Primary Examiner—Douglas D. Watts
Assistant Examiner—Paul M. Heyrana
Attorney, Agent, or Firm—Burns, Doane, Swecker & Mathis

[57] ABSTRACT

A circular saw head (1) for the cutting of side boards (3) from a log (2), has a circular saw blade (4) mounted on a saw shaft (10) by a support flange (5). Within a rim of saw teeth (13) and radially spaced apart from it a frontal annular support surface (12) is provided, extending axially over the frontal surface (8) of the saw blade (4) and located in the plane of the frontally outer edges (14) of the saw teeth (13). The support surface (12) supports the surface cut on the wood by the saw teeth (13), thereby guiding the wood.

6 Claims, 2 Drawing Sheets

CIRCULAR SAW HEAD

The invention concerns a circular saw head for the sawing of side boards from logs (2) or blocks, with an axially outer and inner circular saw blade (105, 106), each provided with a rim of saw teeth (13) and mounted on the frontal side on a supporting flange, on a common hub.

Circular saw heads of this type are usually located in pairs one or either sides of the log or block to be processed and cut one or several side boards, while the log or block is being passed along the circular saw heads. The log or block is guided both by the advance mechanism and the stationary guide elements, which should extend as near the saw heads as possible, in order to support and guide the wood as near as possible to the cutting location.

The "outer" circular saw blade is defined in this context as the blade located on the frontal side on the saw head and producing the inner cut on the log being processed. The "inner" saw blade is axially recessed relative to the outer saw blade and produces the outer cut on the log.

As it is necessary to adjust the circular heads for resetting to different wood dimensions, the guide elements must also be adjusted, which requires a relatively large effort. For this reason, in most cases such additional guide elements are eliminated. This, however, frequently leads inadequate guidance of the wood in the sawing area. The lateral forces generated by the inaccurate guidance of the wood and applied by the wood to the circular saws, make it necessary to use sufficiently thick saw blades, so that they are able to absorb said lateral forces. This results in a wider cut, which in turn leads to an increased production of wood chips, representing an appreciable loss of material.

A circular saw head of the aforementioned generic type without guide elements for the wood is described in DE 03 508 716.

It is known (U.S. Pat. No 861,218) to provide in the case of a single circular saw blade two lateral annular supporting surfaces, located inside the rim of saw teeth and radially spaced apart from it. The annular supporting surface on the frontal side projects axially past the frontal surface of the saw blade and is located in the plane of the frontally outer edge of the saw teeth. By means of these bilateral supporting surfaces the relatively thin saw blade is guided in the cutting gap, so that lateral vibrations are prevented. No guidance or support of the cut wood is provided.

A cutting head is further known (DE 1 913 295) in which a freely rotating, annular frontal surface is provided for the wood being processed.

It is therefore the object of the invention to design a circular saw head of the aforementioned type so that an improved lateral guidance of the wood and thus a reduction of the lateral forces applied by the wood to the saw blades is obtained.

This object is attained according to the invention in that between the support flange of the outer saw blade and the support flange of the inner saw blade a supporting ring is mounted in a freely rotating manner, said ring having an annular supporting surface located between the two support flanges and extending axially over the frontal surface of the inner saw blade, said ring being located in the plane of the frontally outer edges of the saw teeth of the inner blade.

The supporting surface inside the inner saw blade supports the side board produced between the two saw blades. This support of the side board at its outer edge prevents it from applying a lateral force to the inner saw blade. The inner saw blade, which now forms only a relatively narrow annulus and projects only slightly over its support flange, may therefore be relatively thin, so that the cutting gap produces is narrow. The cutting loss experienced is therefore also lower.

The guide of the side board at its outer edge by the freely rotating supporting ring results in an improved guidance of the wood, which contributes significantly to the obtention of more accurately cut wood products. The log is being guided between the support rings of the two pairs of circular saw heads, as the lateral support by the support rings is applied close to the location in which the side boards are cut from the log. Simultaneously, the stresses released by the cutting of the side boards are absorbed.

A reduction in the frictional heat is obtained by the freely rotating mounting of the support ring. Even in the case of very high rpm of the saw head, the risk that the wood surfaces may come into contact with the frontal surfaces of the saw blades and burned by the heat of friction, is substantially reduced. Due to its freely rotating bearing support, the supporting ring assumes the peripheral velocity at which the friction against the longitudinally moving wood is the lowest.

It is known to provide a freely rotating supporting disk in cutting heads for the shaping of round stock (DE 19 13 295, U.S. Pat. No. 2,555,382) for the cut wood surface in front in the center of the cutting head. This measure is appropriate for cutting heads of this type and found to be effective, because the supporting disk of these cutting heads is located in the area of the cut surface of the round stock moving along. In contrast, the center axes of the circular saw heads concerned herein are located far above or below the logs to be processed. The known freely rotating centered supporting disk would be ineffective in this case as there is no wood surface in the area of the supporting disk to be supported.

It is further known (U.S. Pat. No. 4,456,045, FIG. 5) to provide within a circular saw blade an annular supporting surface in front, said surface being located in the plane of the frontally outer edges of the chipping teeth. However, this does not concern circular saw head for the sawing of side boards of wood logs, but a chipping head carrying on its front side a separately driven circular saw, producing a smooth sawn surface on the log. As the support surface is driven at the same rpm as the circular saw, a very high frictional heat may develop, which potentially could lead to the burning of the wood surface.

Figure 2:
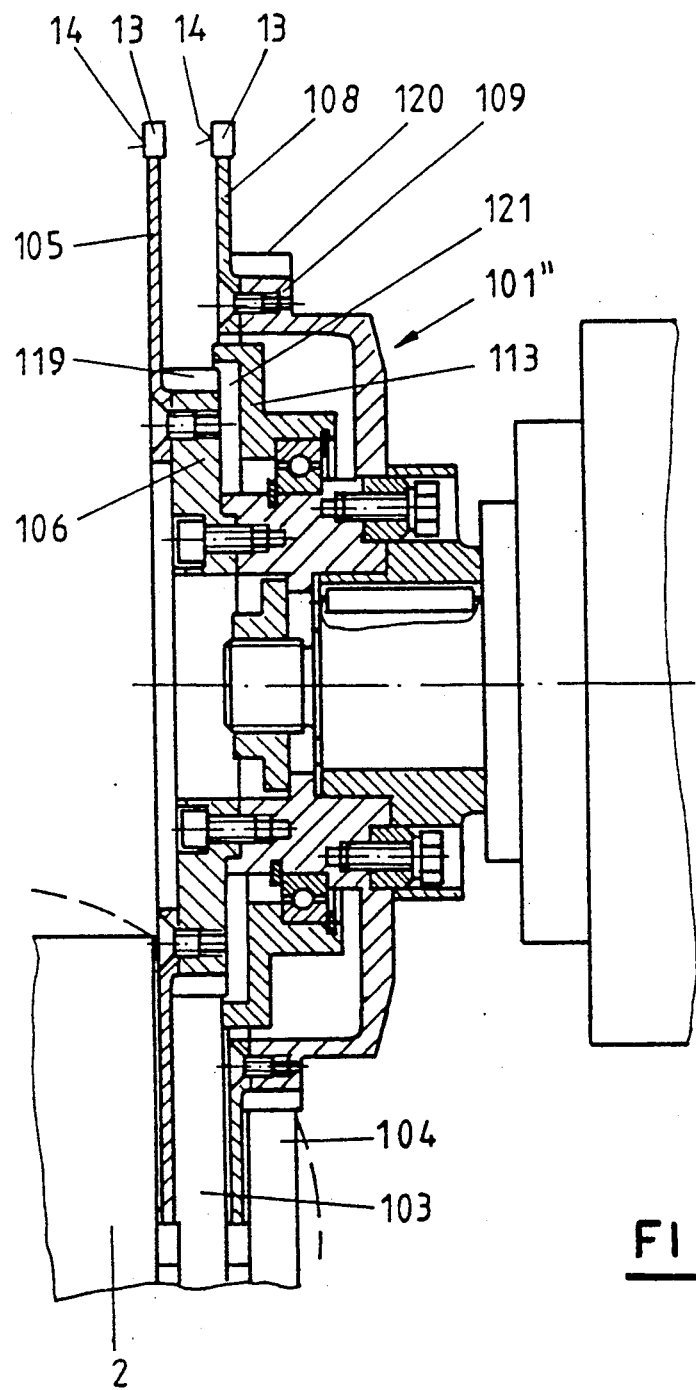

Further advantageous embodiments will become apparent from the examples, also shown in the drawing, in which:

FIG. 1 is a view of a circular saw head in section, with parts of an associated circular saw head located in an axially parallel manner to it and the cross section of the log or block to be processed, being shown, FIG. 2 a modified form of embodiment of the circular saw had of FIG. 1, in section.

The circular saw heads 101 and 101' shown in FIG. 1 are used to cut from a log 2 an inner side board 103 and an outer side board 104. The two circular saw heads 101 and 101' are located above each other and are axially parallel. Prior to feeding the log 2 to the saw heads 101, 101', it is flattened on all four sides. Furthermore, the edges of the log located in front of the edges of the side boards 103, 104 are routed.

The circular saw head 101 and 101' has an axially outer saw blade 105 screwed onto an annular support flange 106, which in turn is mounted by screwing on a hub 107. An inner saw blade 108 offset inwardly relative to the outer saw blade 105 is screwed onto a support flange 109, the diameter of which is larger than the outer diameter of the outer support flange 106. The inner support flange 109 has a poy like configuration and is again connected with the hub 107 or is integral with it.

The hub 107 is removably mounted on a saw shaft flange 110, which is located on the end of a saw shaft 111. The support flange 109 of the inner saw blade 108 encloses an annular space 112, containing a freely rotating support 113. The support ring 113 is mounted by means of a roller bearing 114, for example a deep groove ball bearing, on the hub in a freely rotating manner. The roller bearing 114 is supported axially on a shoulder 115 of the hub 107.

The annular space 112 comprises an annular opening 116, located within the support flange 109, but radially outside the support flange 106. The support ring 113 projects with an annular support surface 117 from said opening 116, with the support surface 117 slightly protruding axially over the frontal surface 118 of the inner saw blade 108. The support surface 117 is located in the plane of the lateral cutting edges 14 of the saw teeth equipped in the usual manner with carbide bits 13.

As seen in FIG. 1, the outer edge of the inner side board 3 cut by the two saw blades 101 and 101' is supported axially outward on the support surface 117 of the ring 113. Independently of the rpm of the circular saw blade, which therefore may be chosen relatively high, the support ring 113 moves as slowly as permitted by the longitudinal movement of the log 2. Any lateral contact of the cut wood surfaces with the rapidly moving frontal surfaces of the saw head is thereby prevented.

As the inner saw blade 108 forms only a relatively small annular surface, and projects only slightly over its support flange 109, and in addition has no lateral supporting forces to absorb, it may be relatively thin, for example as thin as the outer saw blade 105, which is largely unstressed by lateral forces.

The example of embodiment shown in FIG. 2 of a circular saw blade 101" differs from the aforedescribed example only by that routing blades 119 and 120 are located on the periphery of the two support flanges 106 and 109, to process the edges of the side boards 103 and 104, as indicated in FIG. 2, bottom. This eliminates the need to carry out any stepped routing of the edges of the log 2, prior to its processing by the circular saw head 101".

As seen again in FIG. 2, routing edges 119 mounted on the support flange 106 of the inner saw blade 105, extend axially over the distance separating the two saw blades 105 and 106. They project into a frontal recess 121 of the support ring 113. It is obtained in this manner that the edge of the side board 103 is processed over its entire width, without the routing edges 119 colliding with the slower rotating support ring 113.

In the example of embodiment according to FIGS. 1 and 2, the support surface associated with the outer saw blade 105 is eliminated. The main product of the log 2 is then guided indirectly through the support of the edges of the side board 103 by the support surface 117, because the saw blades 101 and 101' are mutually offset in the longitudinal direction of the log 2. The side board supported on the support surface 117 is separated partially only from the main product, so the lateral support and guidance force applied to the side board 103 is also applied to the main product of the log.

I claim:

1. Circular saw head for the cutting of side boards from wood logs (2) or blocks with an axially outer and an inner circular saw blade (105, 106), equipped with a rim of saw teeth (13) and mounted on the frontal side on a support flange on a common hub, characterized in that between the support flange (106) of the outer saw blade (105) and the support flange (109) of the inner saw blade (108) a freely rotating support ring (113) is located, said support ring having an annular support surface (117) located radially between the two support flanges (106, 109) and projecting axially over the frontal surface (118) of the inner saw blade (108), while located in the plane of the frontally outer edges (14) of the saw teeth (13) of the inner saw blade (108).

2. Circular saw head according to claim 1, characterized in that the freely rotating support ring (113) is mounted on the hub (107) on the two support flanges (106, 109).

3. Circular saw head according to claim 2, characterized in that the hub (107) is mounted removably on a saw shaft flange (110).

4. Circular saw blade according to claim 1, characterized in that the support ring (113) is supported axially be means of a roller bearing (114) on a shoulder (115) of the hub (107).

5. Circular saw blade according to claim 1, characterized in that the support flange (109) of the inner circular saw blade (108) has a pot like configuration and enclosing an annular space (112) containing a freely rotating support ring (113), said annular space comprising an annular opening (116) from which the supporting surface (117) is protruding.

6. Circular saw blade according to claim 1, characterized in that routing edges (119, 120) are located on the periphery of the two support flanges (106, 109) and that the routing edges (119) located on the outer support flange (106) extend axially over the distance separating the two saw blades (105, 106) and into a frontal recess (121) of the support ring (113).

* * * * *